United States Patent [19]
Hulvey

[11] Patent Number: 5,754,251
[45] Date of Patent: May 19, 1998

[54] DIGITAL VIDEO VERTICAL SYNCHRONIZATION PULSE DETECTOR

[75] Inventor: Robert W. Hulvey, Hermosa Beach, Calif.

[73] Assignee: TRW Inc., Redondo Beach, Calif.

[21] Appl. No.: 570,855

[22] Filed: Dec. 12, 1995

[51] Int. Cl.⁶ .................................................. H04N 5/10
[52] U.S. Cl. .............................. 348/529; 348/534
[58] Field of Search ............................ 348/529, 525, 348/534, 521, 524, 536, 547, 548; H04N 5/10

[56] References Cited

U.S. PATENT DOCUMENTS

| | | |
|---|---|---|
| 3,751,588 | 8/1973 | Eckenbrecht et al. . |
| 4,166,250 | 8/1979 | Meki et al. . |
| 4,621,289 | 11/1986 | Bart et al. . |
| 4,792,852 | 12/1988 | Narusawa . |
| 5,136,384 | 8/1992 | Pletz-Kirsch et al. . |
| 5,162,910 | 11/1992 | Willis . |
| 5,189,515 | 2/1993 | Chen . |
| 5,229,854 | 7/1993 | Wilber . |
| 5,291,287 | 3/1994 | Murayama et al. . |
| 5,351,093 | 9/1994 | Brown et al. . |
| 5,467,140 | 11/1995 | Sohn .................................. 348/529 |

FOREIGN PATENT DOCUMENTS 61-224667
(A) 10/1986 Japan ............................. H04N 5/10

*Primary Examiner*—Tommy P. Chin
*Assistant Examiner*—Y. Lee
*Attorney, Agent, or Firm*—Michael S. Yatsko

[57] ABSTRACT

A digital video vertical synchronization pulse detector for detecting a vertical synchronization pulse in a video signal is disclosed. The digital video vertical synchronization pulse detector includes a threshold device for comparing a first digital data stream generated from the video signal to a sync threshold. An integration device integrates the video signal in response to the threshold device to generate a second digital data stream. Upper and lower threshold devices compare the second digital data stream to upper and lower thresholds. A detection device responsive to the upper and lower threshold devices detects when the second digital data stream crosses the upper and lower thresholds. When the second digital data stream crosses the upper threshold, the detection device generates a first vertical sync pulse and when the second digital data stream crosses the lower threshold, the detection device is reset to enable generation of subsequent vertical sync pulses.

22 Claims, 1 Drawing Sheet

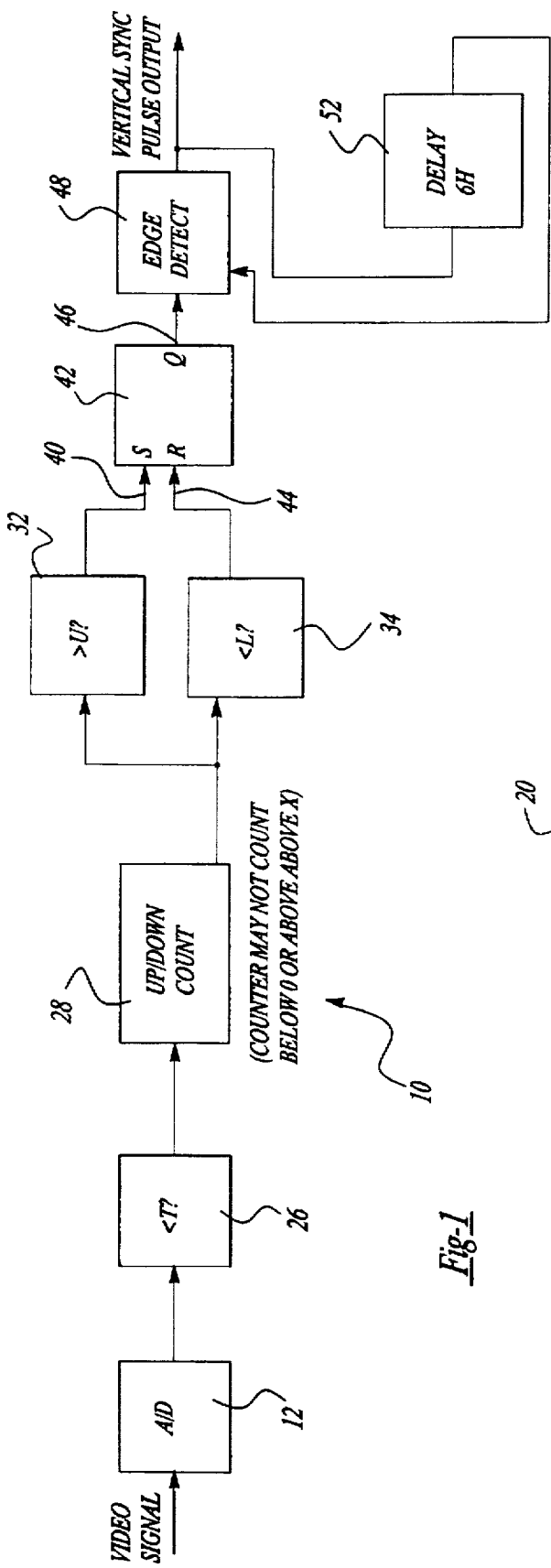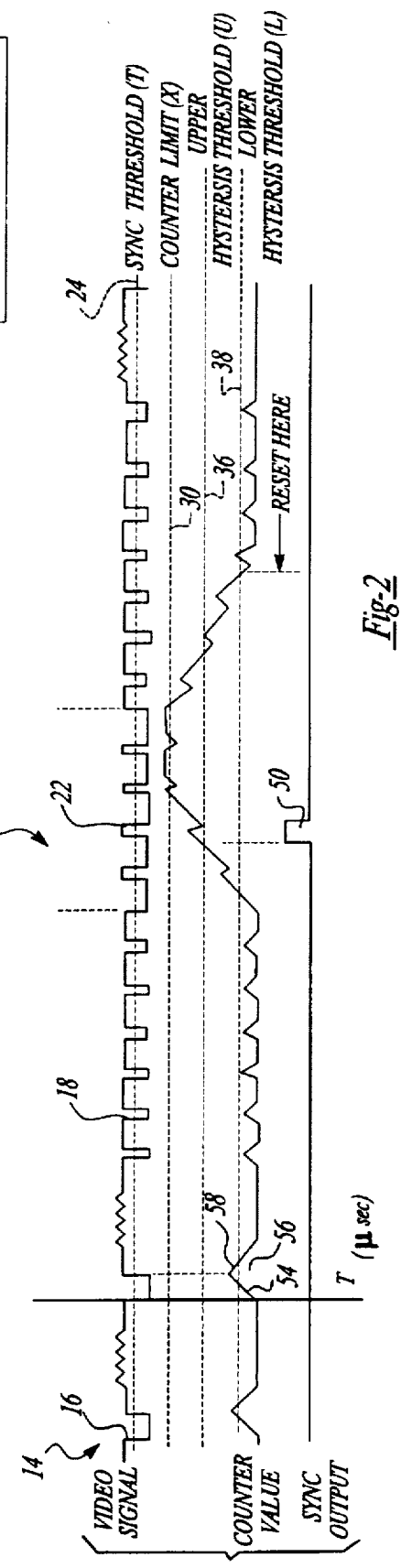

DIGITAL VIDEO VERTICAL SYNCHRONIZATION PULSE DETECTOR

BACKGROUND OF THE INVENTION

1. Field of the Invention

This invention relates generally to digital processing of analog video signals and, more particularly to a digital video vertical synchronization pulse detector.

2. Discussion of the Related Art

Today there are many video products which process digital representations of analog video signals. For example, video digitizers, digital video scramblers and descramblers, televisions, video cassette recorders and video recorders which record analog video in a digital format. In each of these video products, the analog video signal is generally digitized and stored in memory for subsequent use.

In both analog systems and digital systems it is necessary to extract the vertical synchronization pulse in the analog video signal to synchronize frame scanning for the display image. In standard NTSC (National Television System Committee) composite analog video signals which use interlace scanning, there are about 525 horizontal scanning lines per vertical frame. The frame is divided into two vertical scanning fields (i.e. odd and even fields), each field having about 262.5 horizontal scanning lines. The vertical synchronization pulses occur for each field or about every 262.5 horizontal lines to provide field and frame synchronization of the images. The analog video signal also generally includes equalizing pulses occurring before and after the vertical synchronization pulses.

In many of the digital video products in use today, the vertical synchronization pulse is used for the field and frame synchronization of the image, in addition to providing the reference for memory mapping of the digitized analog video signal. During memory mapping each pixel of the digitized analog video signal is generally stored in X and Y addresses in the digital memory with the vertical sync pulse used to reset the Y addresses for each field.

Most conventional vertical sync pulse detection is performed today using analog integration circuitry. However, use of such conventional analog circuitry for digital video products is no- practical because of the large number and the size of the analog components required. Digital signal processing can be used in place of the analog vertical sync pulse detection devices. However, use of conventional digital signal processing for vertical sync pulse detection also has several disadvantages. Specifically, a very large number of digital gates are ordinarily required which is costly. This also makes it extremely difficult, if not impossible to integrate such circuitry into a single integrated circuit. Still further, both the simple analog and digital vertical sync detectors generally have poor noise immunity and in order to achieve better noise immunity, this creates circuits that are unduly complex and prohibitively expensive.

What is needed then is a digital video vertical synchronization pulse detector which does not suffer from the above-mentioned disadvantages. This will, in turn, reduce the number of gates required, reduce the cost of the overall circuit, increase noise immunity and decrease size such that the system can be incorporated into a single integrated circuit with other video processing circuitry. It is, therefore, an object of the present invention to provide such a digital video vertical synchronization pulse detector.

SUMMARY OF THE INVENTION

In accordance with the teachings of the present invention, a digital video vertical synchronization pulse detector for detecting a vertical synchronization pulse in a video signal is disclosed. The digital video vertical synchronization pulse detector detects the vertical synchronization pulse in the video signal and generates subsequent vertical sync pulses used for field and frame synchronization, in addition to memory mapping. This is basically achieved by integrating the video signal and comparing the integrated signal to upper and lower threshold values.

In one preferred embodiment, a digital video vertical synchronization pulse detector for detecting a vertical synchronization pulse in a video signal includes a threshold device for comparing a first digital data stream generated from the video signal to a sync threshold. An integration device integrates the video signal in response to the threshold device to generate a second digital data stream. Upper and lower threshold devices compare the second digital data stream to an upper and lower threshold. A detection device responsive to the upper and lower threshold circuitry detects when the second digital data stream crosses the upper and lower thresholds. When the second digital data stream crosses the upper threshold, the detection device generates a first vertical sync pulse and when the second digital stream crosses the lower threshold, the detection device is reset to enable generation of subsequent vertical sync pulses.

Use of the present invention provides a digital video vertical synchronization pulse detector for detecting a vertical synchronization pulse in a video signal. As a result, the aforementioned disadvantages associated with the current vertical synchronization pulse detectors has been substantially eliminated.

BRIEF DESCRIPTION OF THE DRAWINGS

Still other advantages of the present invention will become apparent to those skilled in the art after reading the following specification and by reference to the drawings in which:

FIG. 1 is a schematic block diagram of one preferred embodiment of the present invention; and FIG. 2 is a series of various waveform diagrams utilized and generated by the present invention.

DETAILED DESCRIPTION OF THE PREFERRED EMBODIMENT(S)

The following description of the preferred embodiment concerning a digital video vertical synchronization pulse detector for detecting vertical synchronization pulses in an analog video signal is merely exemplary in nature and is in no way intended to limit the invention or its application or uses. Moreover, while the present invention is described in detail below with reference to NTSC (National Television System Committee) format video signals, it would be appreciated by those skilled in the art that the present invention, as defined by the appended claims, is clearly not limited to only NTSC format video signals and may include other types of video signal formats such as PAL (Phase Alternation by Line) or SECAM (Sequence a Memoire) . In addition, while the present invention is described below with reference to various hardware devices, the present invention can also be implemented in software.

Referring to FIG. 1, a digital video vertical synchronization pulse detector 10 for detecting a vertical synchronization pulse is shown. The digital video vertical synchronization pulse detector 10 includes an 8-bit digital-to-analog converter 12 for receiving an analog video signal 14 in NTSC format. The analog video signal 14, shown clearly in FIG. 2, includes multiple horizontal sync pulses 16 which occur about every 63.5 microseconds (μsec) or 15.734 KHz. A series of about 6 to 8 equalizing pulses 18 are also shown which occur before and after a serrated vertical sync pulse 20 having serrations 22. The equalizing pulses 18 and the serrations 22 occur at twice the rate of the horizontal sync pulses 16 and are conventionally used to maintain horizontal synchronization during the vertical sync pulse 20. The serrated vertical sync pulse 20 has rate of about 60 Hz and is about 190 microseconds (μsec) in duration with about a 90% duty cycle below a sync threshold (T) 24. The vertical sync pulse 20 has the most energy of any component of the video signal 14 which makes the vertical sync pulse 20 the most robust portion of the video signal 14 for syncing each field of horizontal lines, as well as for digital mapping in digital video products.

The 8-bit analog-to-digital converter 12 digitizes the video signal 14 at a clock rate of about 14.318 MHz which is about four times a color burst signal (not shown) in the analog video signal 14. One way of generating the 14.318 MHz clock is described in detail in application Serial No. 08/571,018, entitled "DIGITAL PHASE ERROR DETECTOR FOR LOCKING TO COLOR SUBCARRIER OF VIDEO SIGNALS", naming as inventors Gregory A. Shreve, Kim S. Guzzino and Robert W. Hulvey (TRW Docket No. 12-0686), filed concurrently herewith, which is hereby incorporated by reference. However, it would be appreciated by those skilled in the art that various other ways of generating the clock pulse for the analog-to-digital converter 12 can also be used.

An 8-bit digital data stream is generated by the analog-to-digital converter 12 and applied to a threshold circuit 26 which is preferably an 8-bit binary weighted comparator 26. The threshold circuit 26 compares the 8-bit binary numbers from the 8-bit digital data stream with the sync threshold (T) 24. The sync threshold (T) 24 is preferably set to about 30 in the 8-bit binary range between the numbers 0 and 255 and can be varied depending on the strength of the video signal 14, as well as the surrounding noise. If the video signal 14 drops below the sync threshold (T) 24, the threshold circuit 26 provides a digital high (i.e. "1") output which stays high while the video signal 14 is below the sync threshold (T) 24. If the video signal 14 exceeds the sync threshold (T) 24, the threshold circuit 26 provides a digital low (i.e. "0") output which stays low while the video signal exceeds the sync threshold (T) 24.

The digital high and low outputs from the threshold circuit 26 are applied to a 6-bit digital up/down counter 28 which essentially integrates the video signal 14. The 9-bit digital up/down counter 28 is clocked by about a 1 MHz clock and is configured so that it may not count below zero (0) or above an upper counter limit (X) 30. The upper counter limit (X) 30 is set to about 60. When the input to the 9-bit digital up/down counter 28 is high, the counter 28 is incremented up and when the input is low, the counter 28 is incremented down.

The output of the 9-bit digital up/down counter 28 which consists of a 9-bit digital data stream is applied in parallel to an upper hysteresis threshold (U) circuit 32 and a lower hysteresis threshold (L) circuit 34. Both the upper and lower hysteresis threshold circuits 32 and 34 are preferably 9-bit binary weighted comparators which compare the binary output from the up/down counter 28 to an upper hysteresis threshold (U) 36 and a lower hysteresis threshold (L) 38. The upper hysteresis threshold (U) 36 is preferably set to about 50 and the lower hysteresis threshold (C) 38 is set to about 15. If the binary output from the up/down counter 28 is greater than the upper hysteresis threshold (U) 36, the upper hysteresis threshold circuit 32 will provide a digital high (i.e. "1") output which stays high while the up/down counter 28 is greater than the upper hysteresis threshold (U) 36. If the binary output of the up/down counter 28 is less than the lower hysteresis threshold (L) 38, the lower hysteresis threshold circuit 34 provides a digital high (i.e. "1") output which stays high while the up/down counter 28 is less than the lower hysteresis threshold (L) 38.

The output from the upper hysteresis threshold circuit 32 is applied to a S-input 40 of an SR flip-flop 42. The output from the lower hysteresis threshold circuit 34 is applied to an R-input 44 of the SR flip-flop 42. When the S-input 40 and the R-input 44 are low, a Q-output 46 is low. When the S-input 40 goes high, the Q-output 46 latches high and stays high after the S-input 40 goes low. When the R-input 44 goes high, the Q-output 46 latches low and stays low after the R-input 44 goes low.

The Q-output 46 of the SR flip-flop 42 is applied to a rising edge detector 48. The rising edge detector 48 outputs a vertical sync pulse 50 upon detecting the rising edge from the Q-output 46. The vertical sync pulse 50 is subsequently used for field and frame synchronization of the image, as well as to reset internal Y address memory counters in digital video products.

This combination of the upper hysteresis threshold (U) 36 and the lower hysteresis threshold (L) 38 with the SR flip-flop 42 enables the digital video vertical synchronization pulse detector 10 to go into a "hold off" mode. In this mode, the pulse detector 10 waits for the up/down counter 28 to decrement below a value which is lower than the sync threshold (T) 24. Therefore, the pulse detector 10 exhibits hysteresis which provides substantial noise immunity.

In order to provide further noise immunity, the digital video vertical synchronization pulse detector 10 also includes a delay circuit 52. The delay circuit 52 is preferably a digital one shot circuit which monitors the rising edge detector 48 output and holds off the rising edge detector 48 from outputting subsequent vertical sync pulses until a delay of about 262 H (i.e. 262×63.5 microseconds) occurs. Alternatively, the delay circuit 52 may also consist of a digital counter which counts the number horizontal sync pulses 16 to inhibit the rising edge detector 48 from outputting a vertical sync pulse until a specified number of horizontal sync pulses have been accumulated, such as six (6) horizontal sync pulses.

In operation, when the video signal 14 drops below the sync threshold (T) 24, the threshold circuit 26 provides a high output (i.e. "1") to the up/down counter 28 which remains high while the video signal 14 is below the sync threshold (T) 24. During the time the video signal 14 is below the sync threshold (T) 24, the up/down counter 28 increments up as the counter value increases, as shown by the rising edge 54 of pulse 56 in FIG. 2. When the video signal 14 exceeds the sync threshold (T) 24, the threshold circuit 26 provides a low output (i.e. "0"). During the low output, the up/down counter 28 decrements and the counter value decreases, as seen by the falling edge 58 of pulse 56.

During the vertical sync pulse 20, the video signal 14 is below the sync threshold (T) 24 more than it is above the sync threshold (T) 24 (i.e. 90% duty cycle below sync threshold (T) 24). This allows the up/down counter 28 to be incremented above the upper hysteresis threshold (U) 36 up to the counter limit (X) 30. During a portion of the 190 microseconds (μsec) of the serrated vertical sync pulse 20, the up/down counter 28 will output binary numbers above the upper hysteresis threshold (U) 36. This causes the upper hysteresis threshold circuit 32 to provide a high output to the S-input 40 of the SR flip-flop 42, thereby causing the edge detector 48 to output a vertical sync pulse 50 upon detecting the rising edge of the pulse from the Q-output 46.

When the serrated vertical sync pulse 20 ends, the video signal 14 begins to stay above the sync threshold (T) 24 which causes the up/down counter 28 to decrement, thereby causing the binary output to decrease. When the binary output from the up/down counter 28 falls below the lower hysteresis threshold (L) 38, the lower hysteresis threshold circuit 34 resets the SR flip-flop 42 which enables the pulse detector 10 to issue subsequent vertical sync pulses 50 when the up/down counter 28 again exceeds the upper hysteresis threshold (U) 36.

If there is substantial noise on the video signal 14 which causes the counter value to increase and decrease sporadically, the pulse detector will not output a vertical sync pulse 50 until the up/down counter 28 is decremented below the lower hysteresis threshold (L) 38. This hysteresis provides substantial noise immunity for the digital video vertical synchronization pulse detector 10. Additional noise immunity is also provided by the delay circuit 52, as discussed above, which makes the digital video vertical synchronization pulse detector 10 very robust even though it uses only a limited amount of gates.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A digital video vertical synchronization pulse detector for detecting a vertical synchronization pulse in a video signal, said pulse detector comprising:

threshold means for comparing a first digital data stream generated from said video signal to a sync threshold;

integration means for integrating said video signal in response to said threshold means, said integration means generating a second digital data stream;

upper threshold means for comparing said second digital data stream to an upper threshold;

lower threshold means for comparing said second digital data stream to a lower threshold; and detection means responsive to said upper and lower threshold means for detecting when said second digital data stream crosses said upper and lower thresholds, wherein when said second digital data stream crosses said upper threshold, said detection means generates a first vertical sync pulse, and wherein when said second digital data stream crosses said lower threshold, said detection means is reset to enable generation of subsequent vertical sync pulses.

2. The digital video vertical synchronization pulse detector as defined in claim 1 further comprising an analog-to-digital converter for generating said first digital data stream from said video signal.

3. The digital video vertical synchronization pulse detector as defined in claim 1 wherein said threshold means includes a binary weighted comparator operable to receive said first digital data stream and compare said first digital data stream with said sync threshold.

4. The digital video vertical synchronization pulse detector as defined in claim 3 wherein said binary weighted comparator is further operable to generate a high output when said first digital data stream is less than said sync threshold and a low output when said first digital data stream is greater than said sync threshold.

5. The digital video vertical synchronization pulse detector as defined in claim 1 wherein said integration means includes a digital up/down counter, said digital up/down counter operable to increment up when said first digital data stream is less than said sync threshold and increment down when said first digital data stream is greater than said sync threshold.

6. The digital video vertical synchronization pulse detector as defined in claim 5 wherein said digital up/down counter increments up when said threshold means provides a high output and increments down when said threshold means provides a low output.

7. The digital video vertical synchronization pulse detector as defined in claim 1 wherein said upper threshold means includes a binary weighted comparator operable to compare said second digital data stream to said upper threshold.

8. The digital video vertical synchronization pulse detector as defined in claim 1 wherein said lower threshold means includes a binary weighted comparator operable to compare said second digital Data stream to said lower threshold.

9. The digital video vertical synchronization pulse detector as defined in claim 1 wherein said detection means includes latching means for latching a first output and a second output, said latching means latching said first output when said second digital data stream is greater than said upper threshold, said latching means latching said second output when said second digital stream is less than said lower threshold.

10. The digital video vertical synchronization pulse detector as defined in claim 9 wherein said latching means includes an SR flip-flop responsive to said upper and lower threshold means.

11. The digital video vertical synchronization pulse detector as defined in claim 9 wherein said detection means further includes a rising edge detector operable to detect the rising edge of said first output to generate said first vertical sync pulse.

12. The digital video vertical synchronization pulse detector as defined in claim 1 wherein said upper and lower threshold means and said detect on means enables said pulse detector to go into a hold-off mode where said pulse detector exhibits hysteresis to provide substantial noise immunity.

13. The digital video vertical synchronization pulse detector as defined in claim 1 further comprising delay means for inhibiting the detection means from outputting subsequent vertical sync pulses until the lapse of a predetermined delay.

14. The digital video vertical synchronization pulse detector as defined in claim 13 wherein said delay means inhibits the detection means from outputting subsequent vertical sync pulses until a delay of about six horizontal sync pulses.

15. A digital video vertical synchronization pulse detector for detecting a vertical synchronization pulse in a video signal, said pulse detector comprising:

a threshold device, said threshold device operable to compare a first digital data stream generated from said video signal to a sync threshold;

a counter, said counter operable to generate a second digital data stream in response to said threshold device;

an upper threshold device, said upper threshold device operable to compare said second digital data stream to an upper threshold;

a lower threshold device, said lower threshold device operable to compare said second digital data stream to a lower threshold;

a latching device, said latching device operable to latch a first output when said second digital data stream is greater than said upper threshold and operable to latch a second output when said second digital data stream is less than said lower threshold; and an edge detector, said edge detector operable to detect said first output to generate a first vertical sync pulse.

16. The digital video vertical synchronization pulse detector as defined in claim 15 wherein said threshold device includes a binary weighted comparator operable to receive said first digital data stream and compare said first digital data stream with said sync threshold, said binary weighted comparator further operable to generate a high output when said first digital data stream is less than said sync threshold and a low output when the first digital data stream is greater than said sync threshold.

17. The digital video vertical synchronization pulse detector as defined in claim 15 wherein said counter is a digital up/down counter, said digital up/down counter operable to increment up when said first digital data stream is less than said sync threshold and increment down when said first digital data stream is greater than said sync threshold.

18. The digital video vertical synchronization pulse detector as defined in claim 15 wherein said upper threshold device includes a binary weighted comparator operable to compare said second digital data stream to said upper threshold and said lower threshold device includes a binary weighted comparator operable to compare said second digital data stream to said lower threshold.

19. The digital video vertical synchronization pulse detector as defined in claim 1 further comprising delay means for inhibiting the edge detector from outputting subsequent vertical sync pulses until the lapse of a predetermined delay.

20. A method for detecting a vertical synchronization pulse in a video signal, said method comprising the steps of:

digitizing said video signal to generate a first digital data stream;

comparing said first digital data stream to a sync threshold to generate a threshold output;

integrating said video signal in response to said threshold output to generate a second digital data stream;

comparing said second digital data stream to an upper threshold;

comparing said second digital data stream to a lower threshold;

generating a first vertical sync pulse when said second digital data stream is greater than said upper threshold; and enabling generation of subsequent sync pulses when said second digital data stream is less than said lower threshold.

21. The method as defined in claim 20 wherein the step of integrating said video signal includes the steps of incrementing up when said first digital data stream is less than said sync threshold and incrementing down when said first digital data stream is greater than said sync threshold.

22. The method as defined in claim 20 further comprising the step of delaying generation of subsequent vertical sync pulses until the lapse of a predetermined delay.

* * * * *